Feb. 20, 1968 K. FRIES ETAL 3,369,471

CIRCULAR EXPOSING DEVICE

Filed June 1, 1965 4 Sheets-Sheet 1

INVENTORS

Kurt Fries

Helmut Weis

BY

Ernest G. Montague

Attorney

CIRCULAR EXPOSING DEVICE

Filed June 1, 1965 4 Sheets-Sheet 2

INVENTORS
Kurt Fries
Helmar Weis
BY Ernest G. Montague
Attorney

INVENTORS

Kurt Fries

Helmar Weis

Attorney

CIRCULAR EXPOSING DEVICE

Filed June 1, 1965 4 Sheets-Sheet 4

INVENTORS
Kurt Fries
Helmar Fries
Ernest G. Montague
Attorney

United States Patent Office 3,369,471
Patented Feb. 20, 1968

3,369,471
CIRCULAR EXPOSING DEVICE

Kurt Fries and Helmar Weis, Solingen, Germany, assignors to Werner Moll, Solingen-Wald, Germany, a citizen of Germany Filed June 1, 1965, Ser. No. 460,385
Claims priority, application Germany, May 30, 1964, M 61,196; Aug. 1, 1964, M 619,661; Feb. 5, 1965, M 64,052
10 Claims. (Cl. 95—77.5)

The present invention relates to a circular exposing device for photo-polymer printing plates having a rotating supporting cylinder for the printing plate, to which are coordinated light tubes aligned along an arcuate line and disposed outside of the supporting cylinder, as well as of about the length of the supporting cylinder.

The photo-polymer plates sold under the name "Dykril" gain always more importance. Plates of this kind are exposed in a conditioning cabinet to a carbon-dioxide atmosphere, in order to make them light-sensitive. In a circular or plane exposing device the plates, held by a stretching web consisting of a transparent foil, are exposed then through a negative with an ultra-violet source of light; hereafter, the unexposed spots of the plates are rinsed out in a special device. The exposing devices require simple, easily operable and reliably working structural forms and details.

Known circular exposing devices have a low efficiency, because the illuminating angle of the light source covers merely at the most one quarter of the supporting cylinder fitted with the printing plates. Furthermore, the stationary coordination of the luminous source with respect to the supporting cylinder, conventional with these circular exposing devices, renders the application of the printing plates to this supporting cylinder rather difficult, provided the latter is supposed to be removed from the device for its application.

It is one object of the present invention to provide a circular exposing device which brings about a higher efficiency than the devices with known structures, coupled with simple construction, and wherein, however, in spite of the arrangement of the light sources about the cylinder in a foolproof manner, an easier loading of the supporting cylinder is obtained.

It is another object of the present invention to provide a circular exposing device, wherein the light tubes are disposed on the inside of two half cups tiltable towards each other and coupled together for mutual weight compensation, which half cups form in their relative closed position a hollow cylinder closed on its end side, and disposed coaxially to the longitudinal axis of the supporting cylinder.

Owing to this arrangement, a circular exposing device is created, which is more advantageous both from the manufacturing and the operating standpoints. Particularly, owing to the arrangement of the light tubes on the inside of two half cups, forming a hollow cylinder in their closed state, both a uniform, as well as an intensive illumination of the printing plates results. By this intensive illumination, accordingly shorter exposure times are possible; thus a higher number of produced plates is achieved. In addition, by the afore-mentioned design, the loading of the supporting cylinder, disposed coaxially and arranged rotatably in the hollow cylinder, is simplified. The half cups, forming the hollow cylinder and connected with each other in a mutual weight balancing, have to be tilted merely to assume their relative open positions. They are thus sufficiently tilted out of the range of the supporting cylinder. The cups remain self-locking in each position, into which they are put. The half cups can be tilted open at their end side to an extent in an easy operation, such that there is even sufficient space for guiding the foil holding the negative and the photo plates, about the supporting cylinder.

It is still another object of the present invention to provide a circular exposing device, which brings about a structurally advantageous and durable construction of the weight balancing means, by securing the mutually congruent half cups to freely protruding supporting arms which have weight balancing pinions disposed on their bearing axles and being in mesh with each other.

It is still another object of the present invention to provide a circular exposing device, wherein supporting arms, complemented to a frame by transversal struts, are arranged on the open sided edge of each half cup and have a throat or recess for the entrance of the axle of the supporting cylinder in the closed position of the half cups.

It is still a further object of the present invention to provide a circular exposing device, wherein protruding arms are provided on the axle of the supporting cylinder for purposes of a simple, fast and foolproof guiding of the transparent foil about the supporting cylinder. The protruding arms carry a supply roll for the transparent foils which are rolled about the envelope surface of the supporting cylinder, and the protruding arms snap in releasably in a position in which the supporting cylinder is almost completely surrounded by the clear foil. In view of such an arrangement, the means performing the tensioning of the material to be exposed are disposed in a limited space. The loading is very simple even with the compact design of the circular exposing device, since the cups do not impair the step of guiding around of the foil when in their open position. The light tubes, disposed closely to the supporting cylinder, are not endangered when the foil is wound around. Not even in case of a fast operation is there a danger of damaging the transparent foil, or of an unsuitable positioning thereof on the supporting cylinder. Rather, only the protruding arms have to be tilted. During this tilting movement, the supply roll of the transparent foils rolls itself up on the envelope surface of the cylinder. During the winding of the transparent foil about the supporting cylinder, the supply roll is simultaneously unwound. While removing the transparent foil from the envelope surface of the supporting cylinder, the supply roll of the transparent foils is wound up again during this tilting of the protruding arms. Particularly, the unwinding movement of the supply roll, taking place while the transparent foil is wound around the supporting cylinder, results in a clean and smooth positioning of the transparent foil on the supporting cylinder, so that it is possible to produce a vacuum in the zone between the transparent foil and the supporting cylinder without disturbances or difficulties, the vacuum being preferably also used for the tensioning of the material to be exposed into a uniform layer. Also, the transparent foil does not have to be gripped anymore. This is advantageous with regard to electrostatic charges and to avoid gripping marks.

It is yet another object of the present invention to provide a circular exposing device, wherein the supply roll for the transparent foil is carried by a supporting shaft which is spring-biased and shiftable in the direction of the longitudinal axis of the supporting-cylinder, the supporting shaft being extending between the ends of the protruding arms projecting beyond the supporting-cylinder envelope. The possibility of shifting and spring-biasing of the supply-roll supporting shaft guarantees a clean unwinding of the supply roll along the envelope surface of the supporting cylinder and permits an avoiding movement of the holding means for the foil, when passing over the free end.

It is also advantageous to provide the protruding arms in the form of double-armed levers which carry on their ends opposite the supply-roll shaft balanced weights. This arrangement permits a fast manipulation with little effort.

It is furthermore of advantage to secure the protruding arms by means of snap-action springs which extend tangentially to the supporting cylinder and are formed with a step in radial direction. This makes for a safe snapping-in of the supporting arms in their end position, yielding at the same time a structure of small dimensions which is, nevertheless, easy to operate.

In order to support the winding-up movement of the transparent foil onto the supply roll, supported by the winding movement of the supply roll, particularly when the transparent foil is removed from the envelop surface of the supporting cylinder, it is considered to be an advantage, according to the present invention, to provide handles on the supply-roll shaft. With these handles, the supply-roll shaft can additionally be rotated in the direction of a winding-up movement, while the protruding arms are being tilted.

In order to obtain a tensioned engagement of the transparent foil, during the unwinding of the supply foil, which is primarily of importance for producing a disturbance-free vacuum in the zone between the transparent foil and the supporting cylinder, the supporting cylinder is locked in the direction corresponding to the unwinding of the supply roll.

According to a preferred arrangement of the locking means, a ratchet gearing is provided on the axle of the supporting cylinder, provided with a cooperating ratchet pawl.

With these and other objects in view, which will become apparent in the following detailed description, the present invention will be clearly understood in connection with the accompanying drawings, in which.

Figure 1:
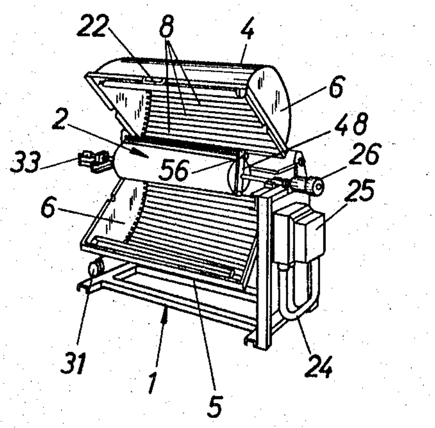
FIGURE 1 is a perspective front view of the circular exposing device according to the present invention, in open position.

Referring now to the drawings, the circular exposing device comprises a frame 1, a rotatable supporting cylinder 2 and a hollow cylinder 3 surrounding the cylinder 2. The hollow cylinder 3 is formed by two congruent half cups 4 and 5, tiltable towards and away from each other and coupled for mutual weight compensation. The half cups 4 and 5 are closed on their ends by walls 6. The separating plane of the hollow cylinder 3 is disposed exactly at the level of a shaft 7 for the supporting cylinder 2.

The inner sides of the two half cups 4 and 5 are equipped with a plurality of lighting tubes 8 spaced apart from each other at equal distances and being coaxial with the shaft 7 of the supporting-cylinder 2. The ultraviolet light of the tubes 8 impinges from all sides and uniformly upon the supporting cylinder 2 and upon photo-polymer printing plates D held on the cylinder 2 (see FIG. 6), respectively. The lighting tubes 8 are disposed at the distance $x$ (FIG. 2) from the envelope of the hollow cylinder 3. The free space, thus formed, serves the purpose of receiving reflectors 9. The latter are directly applied to the inner sides of the cylinder 3 and have therefore, a similarly coaxial arrangement with respect to the supporting-cylinder shaft 7, as mentioned for the half cups 4 and 5.

Figure 4:
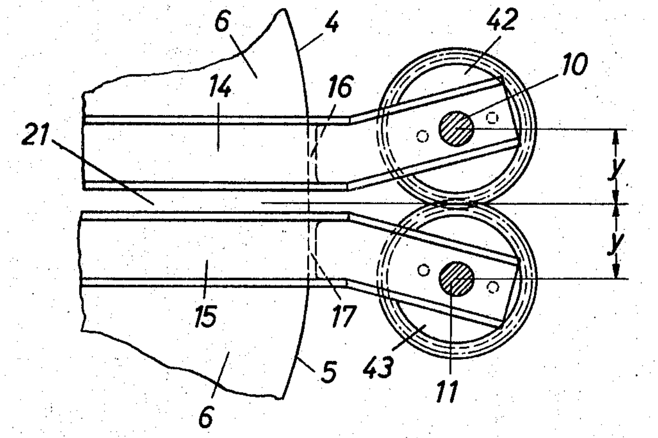
FIG. 4 is an enlarged fragmentary view taken from FIG. 3, illustrating the linking range of the two half cups.

Both half cups 4 and 5 are separately mounted. Their bearing shafts 10 and 11 are disposed for the same length $y$ outside of the separating plane of these two half cups 4 and 5 (FIG. 4). The free ends of the bearing shafts 10 and 11 enter respective bearing bushes 12 and 13, which are flanged to reinforced supporting columns 1' connected to the frame 1.

Figure 2:
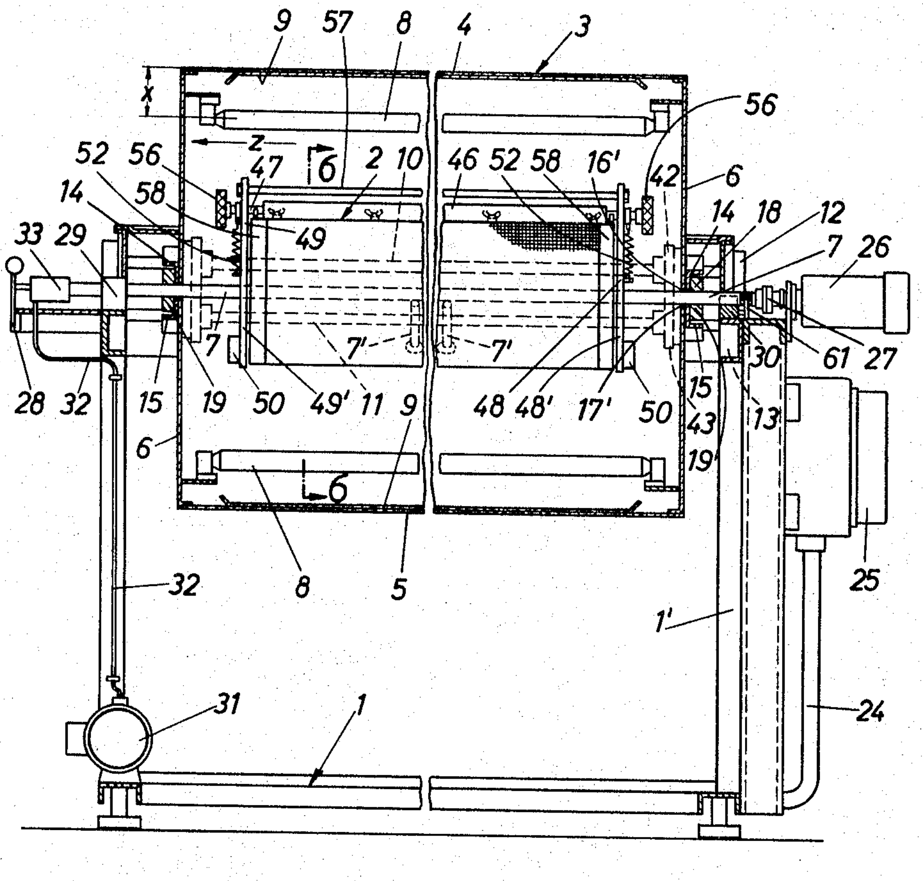
FIG. 2 is a schematic vertical longitudinal section of the device disclosed in FIG. 1.
Figure 7:
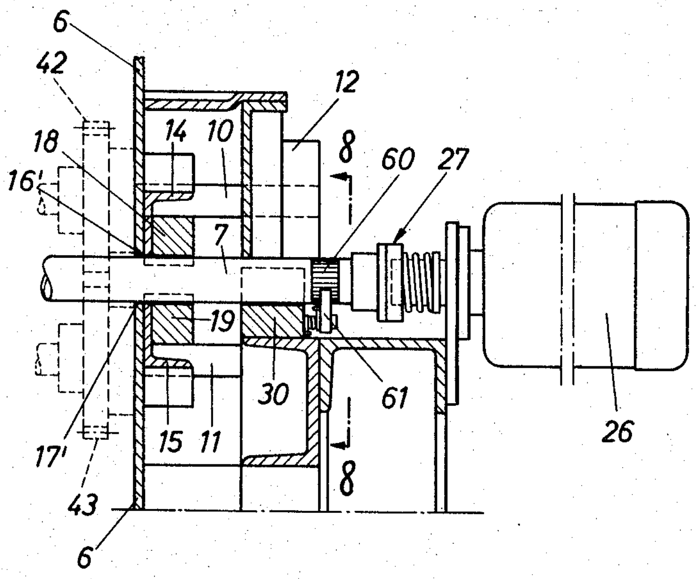
FIG. 7 is a partial, enlarged view taken from FIG. 2 and showing the details of the locking means against return movement of the supporting cylinder.

The half cups 4 and 5 are coupled together for mutual weight compensation. For this purpose, weight-balancing and meshing pinions 42 and 43 of equal size are provided, which are secured for joint rotation to the respective bearings shafts 10 and 11. Freely protruding supporting arms 14 and 15 extend from the pinions 42 and 43, which form a frame with transversal struts 16 and 17; the bent plates forming the half cups 4, 5, as well as the end walls 6 are secured to the formed frame. The supporting arms 14 and 15 running along the end edges of the half cups 4 and 5 have respective throats or recesses 16' and 17' for receiving the supporting-cylinder shaft 7. These recesses are reinforced by bearing bushing halves 18 and 19, respectively (FIGS. 2 and 7).

When tilted against each other, the rims of the half cups 4 and 5 do not engage each other completely (FIGS. 3 and 4), they rather leave free a ventilation gap 21 on all sides, owing to the particular arrangement of the bearing shafts 10, 11 and the provision of distance members 20. With a view to obtaining a buffer effect, these distance members 20 are preferably made from a suitable elastic material.

For opening and closing the hollow cylinder 3, the upper half cup 4 has a handle 22 on its front side (FIG. 1).

Figure 3:
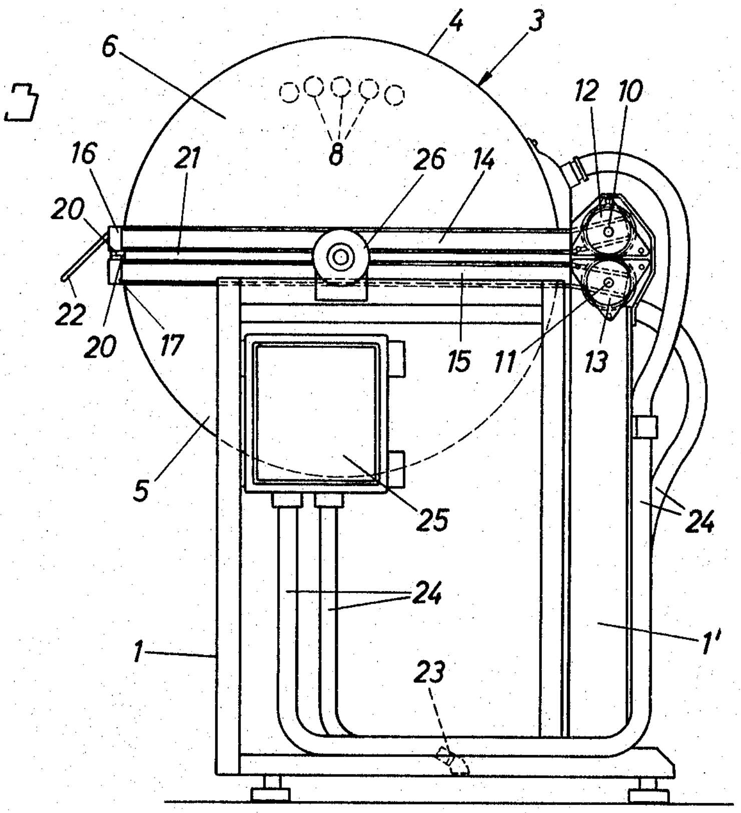
FIG. 3 is a side elevation thereof.

Owing to the weight-balancing device, the half cups 4 and 5 can be stopped in any position. The maximum opening position is limited by a stop buffer 23 provided on the frame 1 (FIG. 3). The transversal strut 17 of the lower half cup 5 abuts this buffer 23, when the device is completely opened. The lighting tubes 8 are connected with a switching panel 25 by way of leads 24.

The supporting cylinder 2, receiving the photo-polymer printing plate D to be exposed, is driven at constant speed by an electric motor 26. A slipping clutch 27 (FIG. 7) permits the disconnection of the device upon actuating a toggle 28 (FIG. 2), resulting in a shifting of the supporting-cylinder shaft 7 in the direction of the arrow $z$. To this end, the shaft 7 is mounted in slide bearings 29 and 30 which are open and permit the removal of the supporting cylinder 2.

The supporting cylinder 2 is designed as a so-called vacuum cylinder. The under-pressure for this purpose is obtained by a compressor 31 secured to the frame 1. The compressor 31 is connected with the hollow supporting-cylinder shaft 7 by way of a flexible conduit 32 and a gate 33. From the shaft 7, radial connecting channels 7' lead to the periphery of the supporting-cylinder body (FIG. 6).

Figure 5:
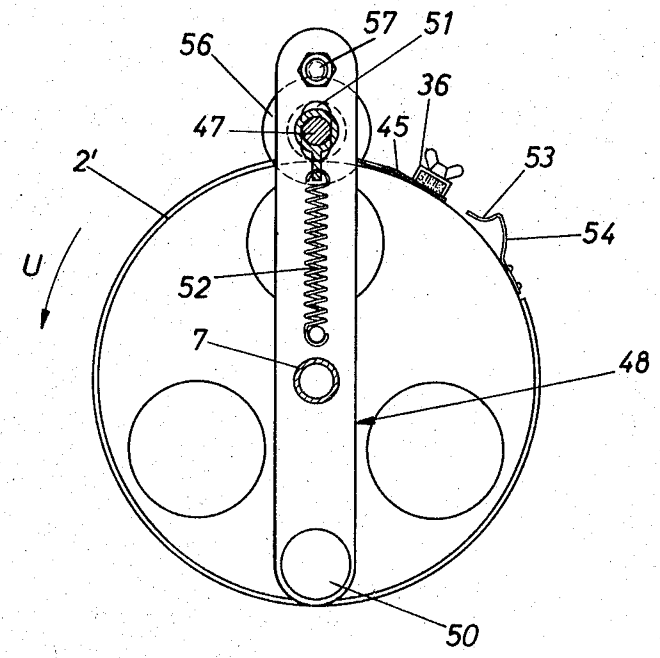
FIG. 5 is an end view of one of the end faces of the supporting cylinder.
Figure 6:
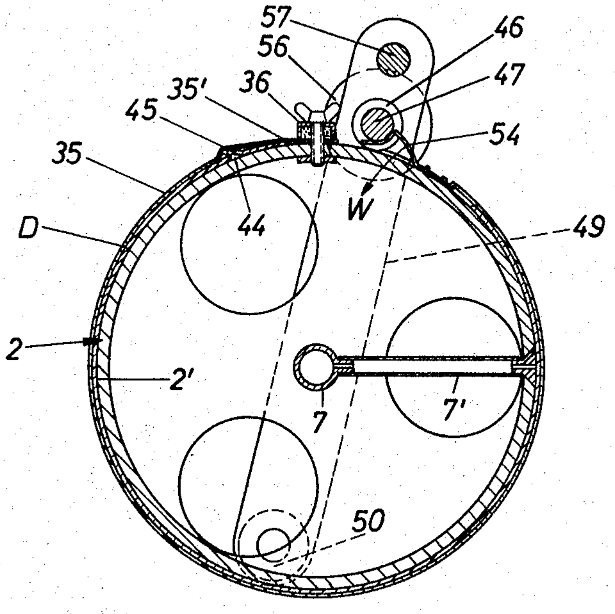
FIG. 6 is an end view of the end face of the supporting cylinder.

As illustrated in FIGS. 5 and 6, a transparent foil 35 is applied to the envelope surface 2' of the supporting cylinder 2. At one end, the foil 35 is attached to a ledge 36 by conventional means (as a matter of example, wing nuts have been shown). The photo-polymer printing plate D is placed between the envelope surface 2' of the cylinder 2 and the transparent foil 35. The plate D is held with one of its longitudinal edges in an insertion groove 44 formed by a longitudinal ledge 45 attached to the outside of the supporting cylinder 2. The transparent foil 35 also overlaps this longitudinal ledge 45 (FIG. 6).

The end of the transparent foil 35 opposite its securing end 35' is wound upon a supply roll 46 for the transparent foils, held by a supporting shaft 47. The latter, in turn, is mounted in protruding arms 48 and 49 which are pivotally connected to the supporting-cylinder shaft 7. The arms 48 and 49 are designed as double-armed levers. The ends 48' and 49' of the arms, opposite the supply roll 46, carry each a balance weight 50.

The supply-roll shaft 47 is movable toward the supporting-cylinder shaft 7 in longitudinal slots 51 of the protruding arms 48 and 49, and is biased in the same direction by springs 52 (FIG. 5). Owing to this arrangement, the supply roll 46 rolls about the envelope surface 2' of the supporting cylinder 2, when the arms 48 and 49 are pivoted about the shaft 7. It is by this pivoting or tilting movement that the transparent foil 35 is applied around the supporting cylinder 2. For this purpose, the protruding arm 48, 49 are pivoted in the direction of the arrow U (FIG. 5). During this movement, the transparent foil 35 is depleated from the supply roll 46 and applied smoothly about the supporting cylinder 2.

When the arms 48 and 49 have been almost completely pivoted about 360°, the arms 48 and 49 snap in behind steps 53 of two springs 54 arranged on the supporting cylinder 2 close to its edge (FIG. 6). Both springs 54 have a rising section, which starts at the envelope surface 2' of the supporting cylinder 2. The terminal portions of the supply-roll shaft 47, when snapping into the steps 53 of the springs 54, depress these springs in the direction of the arrow *w*. The engaged condition can be released by pushing in the springs in the direction of the arrow *w* by hand. The protruding arms 48 and 49 can then be pivoted back against the direction of the arrow U into the position shown in FIG. 5. During this action, the transparent foil 35 will again be taken up by the supply roll 46.

On the outer ends of the supply-roll shaft 47, handles 56 are provided for supporting the winding movement of the transparent foil 35. The two protruding arms 48 and 49 are stabilized by a bar 57 disposed above the supply roll 46 (FIG. 2).

FIG. 2 shows schematically that the supporting cylinder 2 is finely serrated on its surface 2', except for its smooth marginal zones 58. This serration allows complete sucking-off of the air prevailing between the transparent foil 35 and the supporting-cylinder envelope 2', so that optical disturbing effects are eliminated and also the transparent foil 35 is firmly pressed against the printing plate D. The smooth marginal zones 58 of the supporting cylinder 2 bring about a sufficiently thorough sealing of the transparent foil engaging these zones. The vacuum produced also results in a complete and adjusted engagement of the transparent foil 35 directly within the range next to the longitudinal ledge 45 (FIG. 6).

Figure 8:
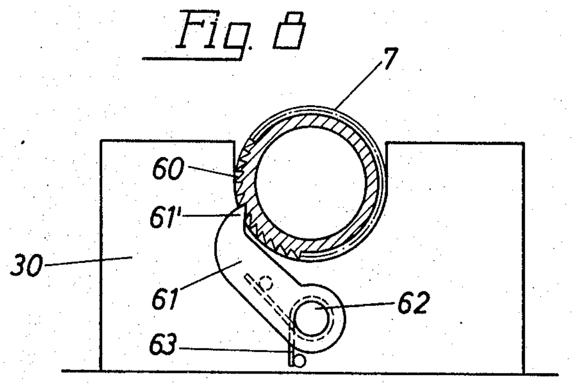
FIG. 8 is a sectional view taken along the lines 8—8 of FIG. 7.

For a tensioned application of the transparent foil 35, the supporting cylinder 2 is locked in the direction of rotation corresponding with the unwinding of the supply roll 46 (arrow U, FIG. 5). With this in mind, the supporting-cylinder shaft 7 has ratchet teeth 60 in the immediate neighborhood of one of the slide bearings 30, a pawl 61 being coordinated to the teeth 60 (FIGS. 7, 8). The pawl 61 is held by a supporting pin 62 secured to the slide bearing 30 underneath the supporting-cylinder shaft 7. A torsion spring 63 is furthermore wound about the supporting pin 62 for resiliently urging a pawl tooth 61' of the pawl 61 against the ratchet teeth 60.

The ratchet engagement, however, can be rendered inoperative very simply, for purposes of removing the entire supporting cylinder 2. The range of the teeth is chosen relatively wide, so that a safe tooth engagement is secured, even if the supporting-cylinder shaft 7 is in its uncoupled condition. In this case, upon having previously loosened the toggle 28, the shaft 7 is longitudinally displaceable. The locking of the supporting-cylinder movement in one direction, however, nevertheless allows to adjust the actual tensioning area and to shift it into the field of view of the operator.

While we have disclosed one embodiment of the present invention, it is to be understood that this embodiment is given by example only and not in a limiting sense, the scope of the present invention being determined by the objects and the claims.

We claim:

1. A circular exposing device for photo-polymer printing plates, comprising
- a rotatable supporting cylinder having a shaft and adapted to carry printing plates,
- two tiltable half cups coupled together for a mutual weight balance and defining in their closed position a hollow cylinder disposed coaxially with the longitudinal axis of said supporting cylinder and surrounding said supporting cylinder,
- said hollow cylinder having closed end faces and containing a plurality of lighting tubes disposed around the outside of and of about the length of said supporting cylinder and mounted along a curved line.

2. The exposing device, as set forth in claim 1, wherein said half cups are congruent relative to each other, and which includes
- protruding supporting arms supporting said half cups,
- bearing shafts for said protruding supporting arms, and
- a weight balancing pinion mounted on each of said bearing shafts and meshing each other.

3. The exposing device, as set forth in claim 2, which includes
- transversal struts disposed at the open-sided edge of each of said half cups and defining jointly with said supporting arms a frame,
- said supporting arms have at least one recess therein for receiving a portion of said shaft of said supporting cylinder in the closed position of said hollow cylinder.

4. The exposing device, as set forth in claim 1, which includes
- protruding arms mounted on said shaft of said supporting cylinder,
- a supply roll for transparent foils rolling about the envelope of said supporting cylinder, and
- means releasably receiving a portion of said protruding arms in a position in which said supporting cylinder is nearly completely surrounded by said transparent foil.

5. The exposing device, as set forth in claim 4, which includes
- a supporting shaft mounted for movement in axial direction of said shaft of said supporting cylinder and spring-biased, and
- said supporting shaft extends between the ends of said supporting arms projecting beyond the envelope of said supporting cylinder.

6. The exposing device, as set forth in claim 5, wherein said supporting arms comprise a double-armed lever, and
- balancing weights carried by said double-armed levers at their ends disposed opposite said supply roll.

7. The exposing device, as set forth in claim 5, which includes
- springs retaining snappingly said supporting arms, and said springs extending in tangential direction of said supporting cylinder and form a step disposed in radial direction of said supporting cylinder.

8. The exposing device, as set forth in claim 1, wherein said supply roll has handles.

9. The exposing device, as set forth in claim 1, which includes means for locking said supporting cylinder against rotation in a direction corresponding with the direction of unwinding said supply roll.

10. The exposing device, as set forth in claim 9, wherein said locking means comprises a ratchet gearing secured to the shaft of said supporting cylinder and a pawl operatively cooperating with said gearing.

References Cited

UNITED STATES PATENTS

| | | | |
|---|---|---|---|
| 1,243,264 | 10/1917 | Cornwall | 95—77.5 X |
| 3,170,381 | 2/1965 | Wanielista | 95—77.5 X |

FOREIGN PATENTS

| | | |
|---|---|---|
| 859,712 | 12/1952 | Germany. |

NORTON ANSHER, *Primary Examiner.*

M. H. HAYES, *Assistant Examiner.*